(12) United States Patent
Sakurai et al.

(10) Patent No.: US 7,555,258 B2
(45) Date of Patent: Jun. 30, 2009

(54) INTEGRATED CIRCUIT DEVICE AND LOW NOISE BLOCK DOWN CONVERTER INCLUDING SAME

(75) Inventors: Shoji Sakurai, Osaka (JP); Yoshiaki Nakano, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 517 days.

(21) Appl. No.: 11/500,904

(22) Filed: Aug. 9, 2006

(65) Prior Publication Data
US 2007/0037515 A1 Feb. 15, 2007

(30) Foreign Application Priority Data
Aug. 10, 2005 (JP) ............... 2005-232494

(51) Int. Cl.
*H04H 20/74* (2008.01)
(52) U.S. Cl. .............. 455/3.02; 455/78; 455/3.03; 455/562.1
(58) Field of Classification Search ............. 455/73–78, 455/83, 560, 562.1, 3.02–3.06, 313, 323, 455/334
See application file for complete search history.

(56) References Cited

U.S. PATENT DOCUMENTS

| | | | |
|---|---|---|---|
| 6,536,042 B1 * | 3/2003 | Paul | 725/69 |
| 6,714,760 B2 * | 3/2004 | Robinett | 455/3.02 |
| 6,895,224 B1 * | 5/2005 | Munday et al. | 455/73 |
| 7,139,540 B2 * | 11/2006 | Wu et al. | 455/251.1 |
| 7,206,591 B2 * | 4/2007 | Ammar et al. | 455/502 |
| 7,240,357 B1 * | 7/2007 | Arsenault et al. | 725/68 |
| 2003/0190900 A1 | 10/2003 | Yasuda et al. | |
| 2004/0029549 A1 * | 2/2004 | Fikart | 455/323 |
| 2004/0235415 A1 | 11/2004 | Atarashi | |
| 2007/0099580 A1 * | 5/2007 | Hosokawa et al. | 455/76 |
| 2007/0142080 A1 * | 6/2007 | Tanaka et al. | 455/552.1 |

FOREIGN PATENT DOCUMENTS

| | | |
|---|---|---|
| JP | 2002-305457 A | 10/2002 |
| JP | 2004-350149 A | 12/2004 |
| WO | WO-2004/054128 A2 | 6/2004 |

\* cited by examiner

*Primary Examiner*—Lana N Le
(74) *Attorney, Agent, or Firm*—Birch, Stewart, Kolasch & Birch, LLP

(57) ABSTRACT

A switch block 1 includes: N inputs; M outputs; N amplification sections each of which amplifies one of each pair of 2N input signals which are generated by dividing N input signals supplied to the N inputs in two; N bandwidth conversion sections each of which subjects, to frequency conversion, the other one of each pair of 2N input signals; and a 2N×M switch section which outputs the 2N output signals, which are supplied from the N amplification sections and the N bandwidth conversion sections, to either: one of the M outputs; or none of the M outputs. With this arrangement, it is possible to provide a signal recombination circuit which can reduce the leakage of the input signals.

15 Claims, 10 Drawing Sheets

INTEGRATED CIRCUIT DEVICE AND LOW NOISE BLOCK DOWN CONVERTER INCLUDING SAME

This Nonprovisional application claims priority under U.S.C. § 119(a) on Patent Application No. 232494/2005 filed in Japan on Aug. 10, 2005, the entire contents of which are hereby incorporated by reference.

FIELD OF THE INVENTION

The present invention relates to an integrated circuit device provided in a low noise block down converter (hereinafter, LNB).

BACKGROUND OF THE INVENTION

LNBs for satellite broadcast receivers have been developed. An LNB receives a polarized signal supplied from a satellite, and converts the polarized signal into a signal in an IF frequency band (950 MHz-2150 MHz).

FIG. 11 outlines a satellite broadcast receiver 101. The satellite broadcast receiver 101 includes an LNB 102, a tuner 103, and a tuner 104. The satellite broadcast receiver 101 is connected to an antenna 100 and a TV receiver 105.

How the components of the satellite broadcast receiver 101 operate is briefly described. The LNB 102 receives, from the antenna 100, the polarized signal in a zero-th frequency band (12.2 GHz-12.7 GHz), and outputs a signal in the IF frequency band. This will be described in detail later.

The tuners 103 and 104 perform a channel selection process so as to extract, from the signal supplied from the LNB 102, a frequency component of the channel designated by the user. The tuners 103 and 104 also perform a decoding process so as to decode a video signal and an audio signal based on the signal selected in the channel selection process.

The TV receiver 105 receives, from the tuner 103 or 104, the video signal and audio signal, and displays the program of the channel designated by the user.

Details of the LNB 102 will be given. The LNB 102 receives M (M≧2) types of polarized signals from N (N≧2) satellites. This LNB is disclosed in the Patent Document 1 (Japanese Laid-Open Patent Application No. 2004-350149; published on Dec. 9, 2004). It is assumed in the present case that the LNB receives two types of polarized signals from two satellites (first and second satellites), respectively.

FIG. 12 shows the circuit configuration of the LNB 102. As shown in the figure, the LNB 102 includes input terminals P11, P12, P21, and P22, low noise amplifiers 3A, 3B, 4A, and 4B, image rejection filter circuits 5A, 5B, 6A, and 6B, local oscillators 13 and 14, frequency conversion circuits 30A and 30B, signal couplers 11A and 11B, a signal recombination circuit 55, a microcomputer 16, intermediate frequency amplifiers 17A and 17B, capacitors 18A and 18B, output terminals 20A and 20B, and a power supply circuit 22.

The following will describe how the components of the LNB 102 operate.

The input terminals P11 and P12 correspond to the first satellite. The input terminal P11 receives the first polarized signal (left-hand polarized signal) of the first satellite, whereas the input terminal P12 receives the second polarized signal (right-hand polarized signal) of the first satellite. The input terminals P21 and P22 correspond to the second satellite. The input terminal P21 receives the first polarized signal (left-hand polarized signal) of the second satellite, whereas the input terminal P22 receives the second polarized signal (right-hand polarized signal) of the second satellite.

The low noise amplifiers 3A and 4A correspond to the first satellite. The low noise amplifier 3A subjects the first polarized signal of the first satellite to low noise amplification, whereas the low noise amplifier 4A subjects the second polarized signal of the first satellite to low noise amplification. The low noise amplifiers 3B and 4B correspond to the second satellite. The low noise amplifier 3B subjects the first polarized signal of the second satellite to low noise amplification, whereas the low noise amplifier 4B subjects the second polarized signal of the second satellite to low noise amplification.

The image rejection filter circuits 5A and 6A correspond to the first satellite. The image rejection filter circuit 5A rejects an image signal of the first polarized signal having been subjected to the low noise amplification by the low noise amplifier 3A, whereas the image rejection filter circuit 6A rejects an image signal of the second polarized signal having been subjected to the low noise amplification by the low noise amplifier 4A. The image rejection filter circuit 5B and 6B correspond to the second satellite. The image rejection filter circuit 5B rejects an image signal of the first polarized signal having been subjected to the low noise amplification by the low noise amplifier 3B, whereas the image rejection filter circuit 6B rejects an image signal of the second polarized signal having been subjected to the low noise amplification by the low noise amplifier 4B.

The local oscillators 13 and 14 generate sinusoidal signals (local oscillator signals) at 11.25 GHz and 14.35 GHz, respectively.

The frequency conversion circuit 30A corresponds to the first satellite and includes mixers 7A and 8A, a high-pass filter 9A, and a low-pass filter 10A. The frequency conversion circuit 30A converts, into the IF frequency band, the frequency bands of the first and second polarized signals of the first satellite, without the overlapping of the frequency bands.

More specifically, in the mixer 7A, the first polarized signal of the first satellite, which is supplied from the image rejection filter circuit 5A, is mixed with the local oscillator signal at 14.35 GHz, which is generated as a result of the oscillation of the local oscillator 14. The mixer 7A then outputs the first polarized signal of the first satellite, whose frequency is within the first IF frequency band (1650 MHz-2150 MHz), and the signal passes through the high-pass filter 9A.

In the mixer 8A, the second polarized signal of the first satellite, which is supplied from the image rejection filter circuit 6A, is mixed with the local oscillator signal at 11.25 GHz, which is generated as a result of the oscillation of the local oscillator 13. The mixer 8A then outputs the second polarized signal of the first satellite, whose frequency is within the second IF frequency band (950 MHz-1450 MHz), and the signal passes through the low-pass filter 10A.

The frequency conversion circuit 30B corresponds to the second satellite, and includes mixers 7B and 8B, a high-pass filter 9B, and a low-pass filter 10B. The frequency conversion circuit 30B converts, into the IF frequency band, the frequency bands of the first and second polarized signals of the second satellite, without the overlapping of the frequency bands.

More specifically, in the mixer 7B, the first polarized signal of the second satellite, which is supplied from the image rejection filter circuit 5B, is mixed with the local oscillator signal at 14.35 GHz, which is generated as a result of the oscillation of the local oscillator 14. The mixer 7B then outputs the first polarized signal of the second satellite, whose frequency is within the first IF frequency band, and the signal passes through the high-pass filter 9B.

In the mixer 8B, the second polarized signal of the first satellite, which is supplied from the image rejection filter circuit 6B, is mixed with the local oscillator signal at 11.25 GHz, which is generated as a result of the oscillation of the local oscillator 13. The mixer 8A then outputs the second polarized signal of the first satellite, whose frequency is within the second IF frequency band, and the signal passes through the low-pass filter 10B.

The signal coupler 11A corresponds to the first satellite. The signal coupler 11A subjects, to frequency multiplication, the first polarized signal having passed through the high-pass filter 9A and the second polarized signal having passed through the low-pass filter 10A, so as to output a first synthesized signal. Therefore, the first synthesized signal is arranged in such a manner that, the first polarized signal of the first satellite, which is included in the first IF frequency band, is provided on the high-band side, whereas the second polarized signal of the first satellite, which is included in the second IF frequency band, is provided on the low-band side.

The signal coupler 11B corresponds to the second satellite. The signal coupler 11B subjects, to frequency multiplication, the first polarized signal having passed through the high-pass filter 9B and the second polarized signal having passed through the low-pass filter 10B, so as to output a second synthesized signal. Therefore, the second synthesized signal is arranged in such a manner that, the first polarized signal of the second satellite, which is included in the first IF frequency band, is provided on the high-band side, whereas the second polarized signal of the second satellite, which is included in the second IF frequency band, is provided on the low-band side.

In response to an instruction of the microcomputer 16, the signal recombination circuit 55 selects, for one outputs, two signals from the first and second synchronized signals. Overlapping of the selection is permitted. Then the signal recombination circuit 55 fetches two polarized signals from the polarized signals in the selected two signals, and synthesizes the fetched polarized signals and outputs the result of the synchronization.

Details of the signal recombination circuit 55 will be given in reference to FIG. 13.

As shown in the figure, the signal recombination circuit 55 includes a 2×4 switch circuit 33 and a bandwidth conversion/synchronization circuit 60. Input terminals I1 and I2 are those of the signal recombination circuit 55. Output terminals O1 and O2 are those of the signal recombination circuit 55. The bandwidth conversion/synchronization circuit 60 includes a local oscillator 47, frequency control circuits 56A, 56B, 56C, and 56D, low-pass filters 36A and 36B, high-pass filters 37A and 37B, and signal couplers 38A and 38B.

The 2×4 switch circuit 33 operates in the aforesaid IF frequency band. In response to an instruction from the microcomputer 16, the 2×4 switch circuit 33 outputs, to the respective terminals M1-M4, the first synchronized signal supplied from the signal coupler 11A and the second synchronized signal supplied from the signal coupler 11B. The number of combinations of these signals is 24.

The local oscillator 47 generates a local oscillator signal at 3.1 GHz.

The frequency control circuits 56A, 56B, 56C, and 56D convert the frequency of the first or second synchronized signals supplied from the terminals M1-M4.

The frequency control circuit 56A is provided with: a three-terminal switch 34A switched by the microcomputer 16; and a mixer 35A on the path which is selected when the switch 34A is ON. The path which is selected when the switch 34A is OFF is a bypass connected to the output side of the mixer 35A.

The frequency control circuit 56A operates as follows: when the frequency conversion of the first and second synchronized signals is carried out, the switch 34A is turned ON and the mixer 35A carries out the frequency conversion; meanwhile, when the frequency conversion of the first and second synchronized signals is not carried out, the switch 34A is turned OFF and the signals pass through the bypass. Details of these operations will be given below.

When the switch 34A is OFF, i.e. when the frequency conversion of the first and second synchronized signals is not carried out, the first or second synchronized signal supplied from the terminal M1 passes through the bypass. On this account, the output signal of the frequency control circuit 56A is the aforesaid first or second synchronized signal. That is, provided on the high-band side of the output signal of the frequency control circuit 56A is the first polarized signal, of the first or second satellite, which is on the high-band side of the first or second synchronized signal. Provided on the low-band side is the second polarized signal, of the first or second satellite, which is on the low-band side of the first or second synchronized signal. Thereafter, the second polarized signal of the first or second satellite, which is on the low-band side of the output signal of the frequency control circuit 56A, is supplied to the signal coupler 38A via the low-pass filter 36A.

When the switch 34A is ON, i.e. when the frequency conversion of the first and second synchronized signals is carried out, the first or second synchronized signal supplied from the terminal M1 is mixed, in the mixer 35A, with the local oscillator signal at 3.1 GHz which is supplied from the local oscillator 47, so that the frequency of the first or second synchronized signal is converted. That is, provided on the high-band side of the output signal of the frequency control circuit 56A is the second polarized signal, of the first or second satellite, which is on the low-band side of the first or second synchronized signal. Provided on the low-band side of the output signal of the frequency control circuit 56A is the first polarized signal, of the first or second satellite, which is on the high-band side of the first or second synchronized signal. Thereafter, the first polarized signal, of the first or second satellite, which is on the low-band side of the output signal of the frequency control circuit 56A, is supplied to the signal coupler 38A via the low-pass filter 36A.

The frequency control circuit 56B includes: a three-terminal switch 34B switched by the microcomputer 16; and a mixer 35B on the path selected when the switch 34B is ON. The path selected when the switch 34B is OFF is the bypass which is connected to the output side of the mixer 35B.

The frequency control circuit 56B operates as follows: when the frequency conversion of the first and second synchronized signals is carried out, the switch 34B is turned ON and the mixer 35B carries out the frequency conversion; meanwhile, when the frequency conversion of the first and second synchronized signals is not carried out, the switch 34B is turned OFF and the signals pass through the bypass. Details of these operations will be given below.

When the switch 34B is OFF, i.e. when the frequency conversion of the first and second synchronized signals is not carried out, the first or second synchronized signal supplied from the terminal M2 passes through the bypass. Therefore, the output signal of the frequency control circuit 56B is identical with the aforesaid output signal of the frequency control circuit 56A when the switch 34A is OFF. Thereafter, the first polarized signal, of the first or second satellite, which is on the high-band side of the output signal of the frequency control circuit 56B, is supplied to the signal coupler 38A via the high-pass filter 37A.

When the switch 34B is ON, i.e. when the frequency conversion of the first and second synthesized signals is carried out, the first or second synchronized signal supplied from the terminal M2 is mixed, in the mixer 35B, with the local oscillator signal at 3.1 Ghz supplied from the local oscillator 47, so that the frequency of the first or second synchronized signal is converted. As a result, the output signal of the frequency control circuit 56B is identical with the aforesaid output signal of the frequency control circuit 56A when the switch 34A is ON. Thereafter, the second polarized signal, of the first or second satellite, which is on the high-band side of the output signal of the frequency control circuit 56B, is supplied to the signal coupler 38A via the high-pass filter 37A.

The signal coupler 38A synthesizes the aforesaid signal having passed through the low-pass filter 36A and the aforesaid signal having passed through the high-pass filter 37A, so as to output a third synthesized signal.

The frequency control circuit 56C is provided with: a three-terminal switch 34C switched by the microcomputer 16; and a mixer 35C on the path selected when the switch 34C is ON. The path selected when the switch 34C is OFF is the bypass connected to the output side of the mixer 35C. Since the frequency control circuit 56C operates in the same manner as the frequency control circuit 56A, the description thereof is omitted.

The frequency control circuit 56D is provided with: a three-terminal switch 34D switched by the microcomputer 16; and a mixer 35D on the path selected when the switch 34D is ON. The path selected when the switch 34D is OFF is the bypass connected to the output side of the mixer 35D. Since the frequency control circuit 56D operates in the same manner as the frequency control circuit 56B, the description thereof is omitted.

The signal coupler 38B synthesizes a signal having passed through the low-pass filter 36B and a signal having passed through the high-pass filter 37B, so as to output a fourth synthesized signal.

The intermediate frequency amplifier 17A amplifies the third synthesized signal, whereas the intermediate frequency amplifier 17B amplifies the fourth synthesized signal.

The capacitor 18A removes a low frequency noise of the third synthesized signal amplified by the intermediate frequency amplifier 17A. The capacitor 18B removes a low frequency noise of the fourth synthesized signal amplified by the intermediate frequency amplifier 17B.

As a result of the above, the output terminals 20A and 20B output the third and fourth synthesized signals each of which is arranged such that any two of the first polarized signal of the first satellite, the second polarized signal of the first satellite, the first polarized signal of the second satellite, and the second polarized signal of the second satellite are provided on the high-band side and the low-band side, respectively. The power supply circuit 22 supplies power to the components of the LNB 102.

As described above, in the frequency control circuits 56A, 56B, 56C, and 56D, a case where the frequency conversion of the input signal supplied to the signal recombination circuit 55 is carried out and a case where the frequency conversion is not carried out is switched over by switching the path through which the input signal passes. The switching of the path is carried out by turning ON/OFF the switches 34A, 34B, 34C, and 34D in each of the frequency control circuits 56A, 56B, 56C, and 56D.

In the foregoing arrangement, however, when the switch 34A, 34B, 34C, or 34D is switched ON/OFF, the input signal is leaked to the path which is not connected to the switch 34A, 34B, 34C, or 34D, because of the parasitic capacity of that path.

More specifically, when the switch 34A, 34B, 34C, or 34D is OFF, the input signal is leaked to the path to which the mixer 35A, 35B, 35C, or 35D is connected, on account of the parasitic capacity on the path to which the mixer 35A, 35B, 35C, or 35D is connected. The leakage of the input signal, however, is sufficiently attenuated when passing through the mixer 35A, 35B, 35C, or 35D.

On the other hand, when the switch 34A, 34B, 34C, or 34D is ON, the input signal is leaked to the bypass which is the path selected when the switch 34A, 34B, 34C, or 34D is OFF, because of the parasitic capacity on the bypass. Being different from the case where the switch 34A 34B, 34C, or 34D is OFF, in this case the input signal having been subjected to the frequency conversion in the mixer 35A, 35B, 35C, or 35D is mixed with the leakage of the input signal passing through the bypass, on the output side of the mixer 35A, 35B, 35C, or 35D. For this reason, the quality of the input signal is deteriorated.

SUMMARY OF THE INVENTION

The present invention was done to solve the above-described problem, and the objective of the present invention is to provide an integrated circuit device suitable for a signal recombination circuit that can reduce the leakage of the input signals, and a low noise block down converter including the integrated circuit device.

To achieve they objective, the integrated circuit device of the present invention, which has N inputs and M outputs, each of N input signals supplied to the respective N inputs being divided into two divided input signals, includes: N amplification sections each of which amplifies one of said divided input signals; N bandwidth conversion section each of which subjects, to frequency conversion, the other one of said divided input signals; and a 2N×M switch section which (i) receives 2N input signals that are made up of 2N output signals supplied from the N amplification sections and the N bandwidth conversion section, and (ii) is controlled so as to output a signal, which is selected from said 2N input signals, to an output selected from said M outputs.

According to the arrangement above, the integrated circuit device of the present invention is arranged in such a manner that the input signals are supplied through (i) a path where the frequency conversion of the input signal is carried out and (ii) a path where the frequency conversion is not carried out. In this manner, the signals which are subjected to frequency conversion and the signals which are not subjected to frequency conversion are generated from N input signals, and the 2N×M switch section selects, from those 2N signals, a required signal and sends the selected signal to a desired output selected from M outputs. As a result, being different from the conventional art, it is unnecessary to switch the path by using switches in accordance with whether or not frequency conversion is carried out. It is therefore possible to reduce the leakage of the input signals on account of the switching of the path. Consequently, an integrated circuit device suitable for a signal recombination circuit that can reduce the leakage of the input signals is provided.

To achieve the objective above, the low noise block down converter of the present invention includes, in its signal recombination circuit, the aforesaid integrated circuit device.

According to this arrangement, the low noise block down converter of the present invention can reduce the leakage of the input signals, by adopting the aforesaid integrated circuit device in the signal recombination circuit.

Additional objects, features, and strengths of the present invention will be made clear by the description below. Further, the advantages of the present invention will be evident from the following explanation in reference to the drawings.

DESCRIPTION OF THE EMBODIMENTS

Embodiment 1

The following will describe an embodiment of the present invention in reference to figures. Described below is a case where an integrated circuit device (hereinafter, switch block) of the present invention is a part of a signal recombination circuit of a LNB.

Figure 2:
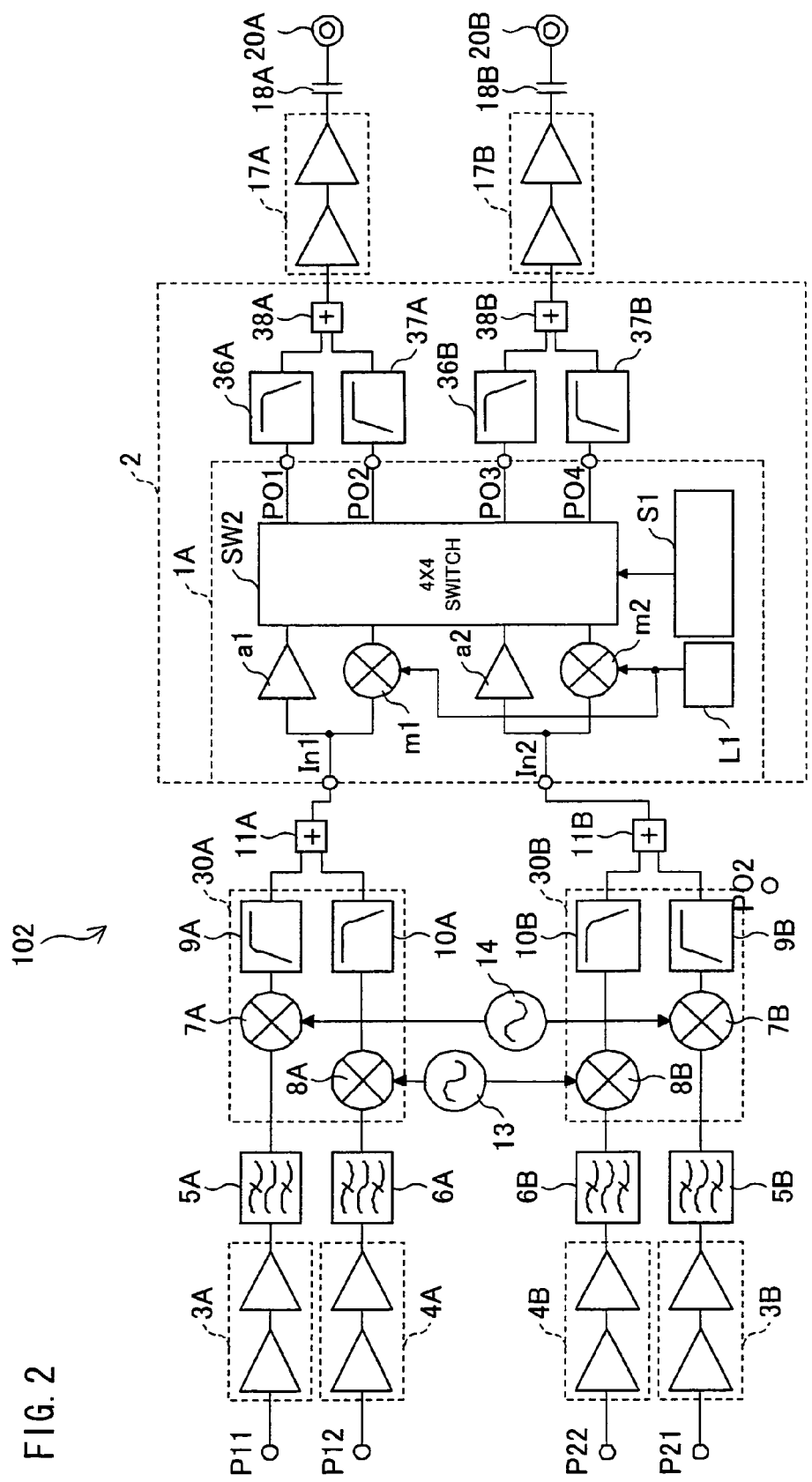
FIG. 2 relates to another embodiment and is a block diagram showing the substantial part of a signal recombination circuit 2.
Figure 13:
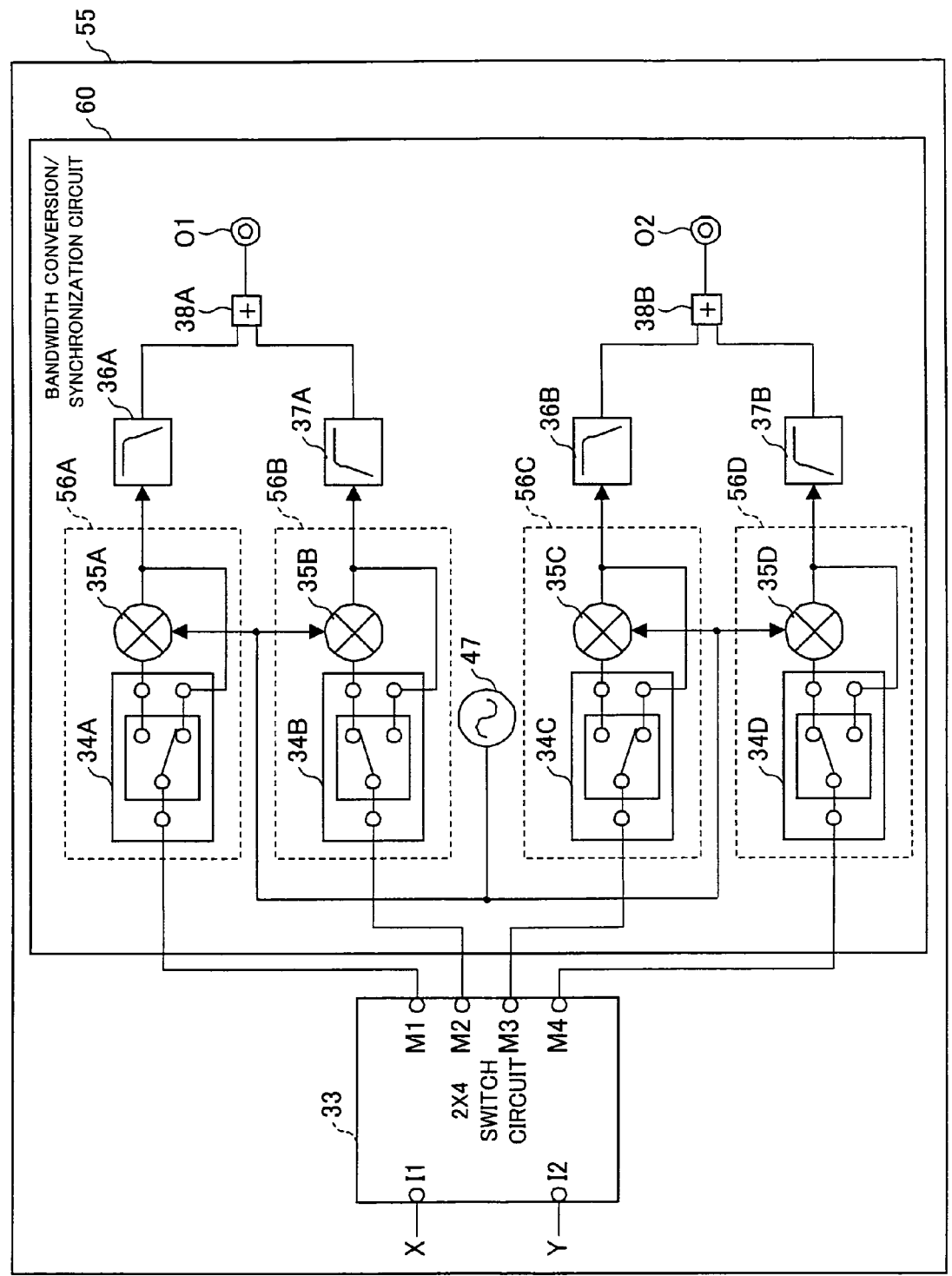
FIG. 13 relates to the conventional art and is a circuit diagram of a signal recombination circuit of the LNB.

FIG. 2 is a circuit diagram of a LNB 102, in which the signal recombination circuit 55 in FIG. 13 is replaced by a signal recombination circuit 2 of the present embodiment. Since the circuit configuration of the LNB 102 has already been described in Background of the Invention, the description thereof is omitted. Also, members having the same functions are given the same numbers, unless otherwise stated.

The signal recombination circuit 2 receives a first synthesized signal and a second synthesized signal. Since the first and second synthesized signals are generated in the same manner as the aforesaid first and second synthesized signal in the conventional art, the description thereof is omitted.

As shown in the figure, the signal recombination circuit 2 includes a switch block 1A, the low-pass filters 36A and 36B of FIG. 13, the high-pass filters 37A and 37B of FIG. 13, and the signal couplers 38A and 38B of FIG. 13.

The switch block 1A includes: amplifiers a1 and a2; mixers m1 and m2; a 4×4 switch circuit SW2; a local signal generator L1 which generates a local signal supplied to the mixers; and a control device S1 which controls the 4×4 switch circuit SW2. Input terminals In1 and In2 are those of the switch block 1A, and also functions as the input terminals of the signal recombination circuit 2. Output terminals PO1-PO4 function as input terminals of the switch block 1A.

Details of the signal recombination circuit 2 will be given below.

The input terminal In1 receives the first synchronized signal, whereas the input terminal In2 receives the second synchronized signal. The amplifier a1 amplifies the first synchronized signal supplied to the input terminal In1, whereas the amplifier a2 amplifies the second synthesized signal supplied to the input terminal In2. The mixer m1 subjects, to frequency conversion, the first synthesized signal supplied to the input terminal In1. The mixer m2 subjects, to frequency conversion, the second synthesized signal supplied to the input terminal In2.

In response to an instruction from the control device S1, the 4×4 switch circuit SW2 outputs, to a terminal selected from the output terminals PO1-PO4, a signal selected from the first and second synthesized signals amplified by the respective amplifiers a1 and a2 and the first and second synthesized signals subjected to the frequency conversion by the respective mixers m1 and m2.

The low-pass filters 36A and 36B, the high-pass filters 37A and 37B, and the signal couplers 38A and 38B are not described in detail, because these members are identical with those having been described in the conventional art.

The following will describe how the components of the signal recombination circuit 2 are connected to one another.

The input terminal In1 is connected to the amplifier a1 and the mixer m1. In a similar manner, the input terminal In2 is connected to the amplifier a2 and the mixer m2. The outputs of the amplifiers a1 and a2 and the outputs of the mixers m1 and m2 are supplied to the 4×4 switch circuit SW2. The output terminal PO1 of the 4×4 switch circuit SW2 is connected to the low-pass filter 36A, the output terminal PO2 of the 4×4 switch circuit SW2 is connected to the high-pas filter 37A, the output terminal PO3 of the 4×4 switch circuit SW2 is connected to the low-pass filter 36B, and the output terminal PO4 of the 4×4 switch circuit SW2 is connected to the high-pass filter 37B.

The output of the low-pass filter 36A and the output of the high-pass filter 37A are supplied to the signal coupler 38A. The output of the low-pass filter 36B and the output of the high-pass filter 37B are supplied to the signal coupler 38B.

The following will describe how the signal recombination circuit 2 operates.

The first synthesized signal supplied to the input terminal In1 is divided into two signals, and these signals are supplied to the amplifier a1 and the mixer m1, respectively. The amplifier a1 amplifies the first synchronized signal and supplies the signal to the 4×4 switch circuit SW2. The mixer m1 performs frequency conversion by mixing the first synthesized signal with the local signal supplied from the local signal generator L1, and supplies the resultant signal to the 4×4 switch circuit SW2.

The second synthesized signal supplied to the input terminal In2 is divided into two signals, and these signals are supplied to the amplifier a2 and the mixer m2, respectively. The amplifier a2 amplifies the second synthesized signal and supplies the signal to the 4×4 switch circuit SW2. The mixer m2 performs frequency conversion by mixing the second synchronized signal with the local signal supplied from the local signal generator L1, and supplies the resultant signal to the 4×4 switch circuit SW2.

In response to an instruction from the control device S1, the 4×4 switch circuit SW2 outputs, to a terminal selected from the output terminals PO1-PO4, a signal selected from the output signals of the amplifiers a1 and a2 and the mixers m1 and m2.

The low-pass filter 36A allows a frequency component on the low-band side of the output signal of the output terminal PO1 to pass through. The high-pass filter 37A allows a frequency component on the high-band side of the output signal of the output terminal PO2 to pass through. The signal coupler 38A synthesizes the output signals of the low-pass filter 36A and high-pass filter 37A, so as to output a third synthesized signal.

The low-pass filter 36B allows a frequency component on the low-band side of the output signal of the output terminal PO3 to pass through. The high-pass filter 37B allows a frequency component on the high-band side of the output signal of the output terminal PO4 to pass through. The signal coupler 38B synthesizes the output signals of the low-pass filter 36B and the high-pass filter 37B, so as to output a fourth synthesized signal.

The processes after the third and fourth synthesized signals are supplied to the intermediate frequency amplifiers 17A and 17B in the later stages are identical with those described in the conventional art. The descriptions of those processes are therefore omitted.

As described above, the signal recombination circuit 2 is arranged such that each of the first and second synthesized signals is divided into two types of signals and the respective signals as a result of the division are supplied to (i) the path (on which the amplifiers a1 and a2 are provided) where the first and second synthesized signals are not subjected to frequency conversion and (ii) the path (on which the mixers m1 and m2 are provided) where the first and second synthesized signals are subjected to frequency conversion. In the present embodiment, both a signal not subjected to the frequency conversion and a signal subjected to the frequency conversion are generated in advance from each of the first and second synthesized signals. Then, among these four types of signals, a required signal is selected and supplied to a desirable terminal among the output terminals PO1-PO4. For example, to obtain a third synthesized signal by the signal coupler 38A, two signals are selected from the four input signals of the 4×4 switch circuit SW2, and one of the selected signals is supplied to the output terminal PO1, whereas the other one of the selected signals is supplied to the output terminal PO2.

With the arrangement above, it is unnecessary to switch, using the switches 34A, 34B, 34C, and 34D, between (i) the path where the first and second synthesized signals are not subjected to frequency conversion and (ii) the path where the first and second synthesized signals are subjected to frequency conversion, as compared to the signal recombination circuit 55 of the conventional art (see FIG. 13). It is therefore possible to reduce the leakages of the first and second synthesized signals, which occur on account of the switching between (i) the path where the first and second synthesized signals are not subjected to frequency conversion and (ii) the path where the first and second synthesized signals are subjected to frequency conversion, at the time of turning ON/OFF the switches 34A, 34B, 34C, and 34D.

In the switch block 1A, the 4×4 switch circuit SW2 is on the stage subsequent to the mixers m1 and m2 and the amplifiers a1 and a2. For this reason, the number of mixers is identical with the number of input terminals, and hence it is possible to reduce the number of mixers as compared to the conventional art, in a case where N<M. As a result, cost reduction is achieved because the signal recombination circuit 2 is downsized.

The path where the first and second synthesized signals are not subjected to frequency conversion and the path where the first and second synthesized signals are subjected to frequency conversion are provided so as to be independent from each other. For this reason, the output level of each of the first and second synthesized signals changes, when the path from which the signal is outputted is switched. It is preferable that the input level of the signal supplied to a tuner which is on the stage subsequent to the LNB 102 is consistent.

To achieve this, in the switch block 1A, the gains of the mixers m1 and m2 are set so as to be identical with the gains of the amplifiers a1 and a2. By doing so, the output level of each of the first and second synthesized signals is consistent even if the path from which the signal is outputted is switched.

Figure 1:
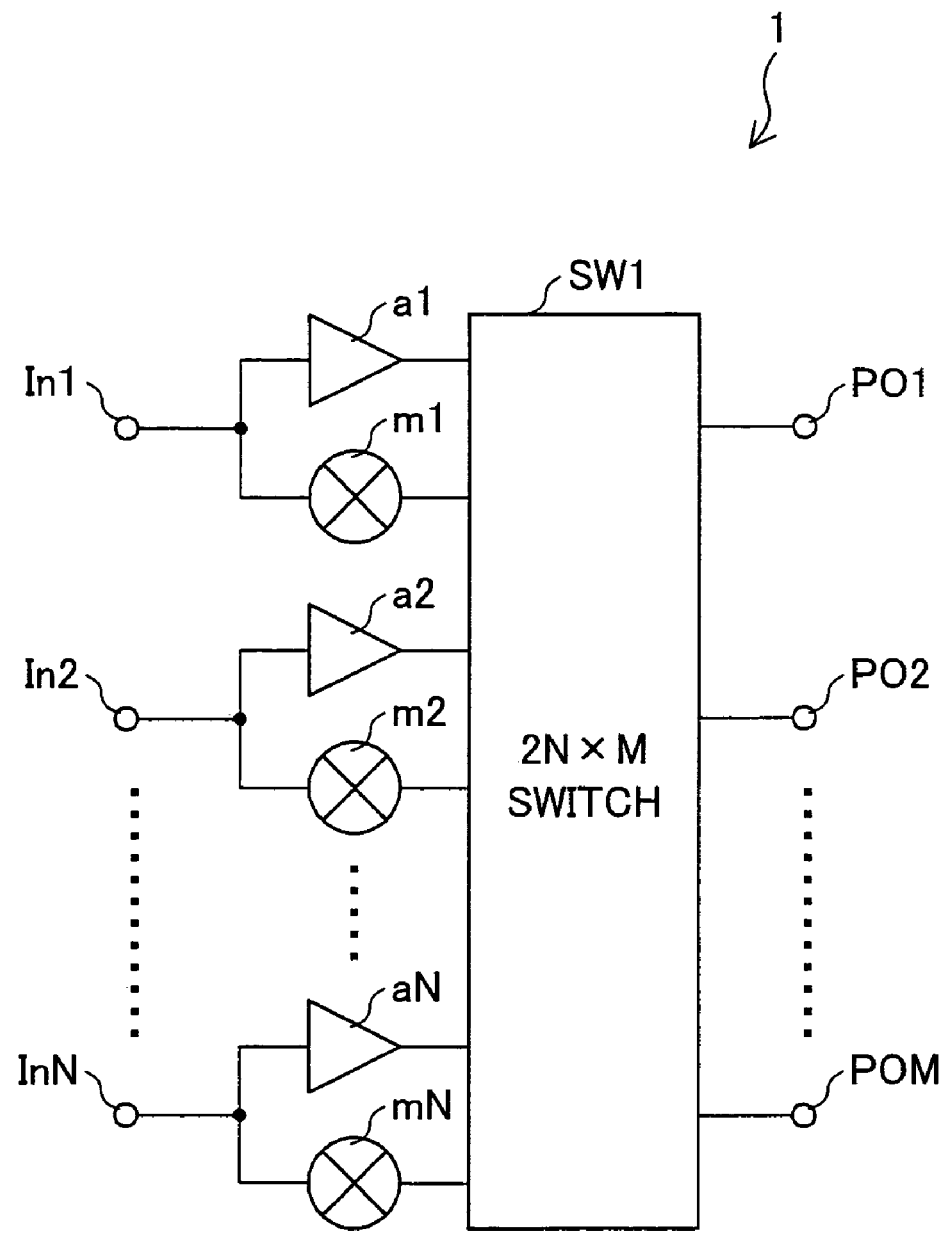
FIG. 1 relates to one embodiment and is a block diagram showing the substantial part of a signal recombination circuit 1.

The operation and characteristics of the signal recombination circuit 2 including the switch block 1A have been discussed. Now, referring to FIG. 1, the following outlines a switch block 1 which is a general form of the switch block 1A in the signal recombination circuit 2.

As shown in the figure, the switch block 1 includes: N input terminals In1-InN (N inputs); N amplifiers a1-aN (N amplification sections); N mixers m1-mN (N bandwidth conversion sections); a 2N×M switch circuit SW1 (2N×M switch section); M output terminals PO1-POM (M outputs); a local signal generator L1 which outputs a local signal supplied to a mixer (not illustrated); and a control device S1 which controls the 2N×M switch circuit SW1.

The following illustrates how the components of the switch block 1 are connected to one another.

The N input terminals In1-InN are connected to the N amplifiers a1-aN and N mixers m1-mN. The outputs of the N amplifiers a1-aN and N mixers m1-mN are supplied to the 2N×M switch circuit SW1. For example, the input terminal In1 is connected to the amplifier a1 and mixer m1, and the outputs of the amplifier a1 and mixer m1 are supplied to the 2N×M switch circuit SW1.

In case where the input terminals In1-InN are differential input terminals and the output terminals PO1-POM are differential output terminals, a differential pair of terminals functions as one input terminal or one output terminal.

Taking the mixer mN as an example, the following will describe in what manner the mixers m1 and m2 operate at the time of frequency conversion.

Figure 3:
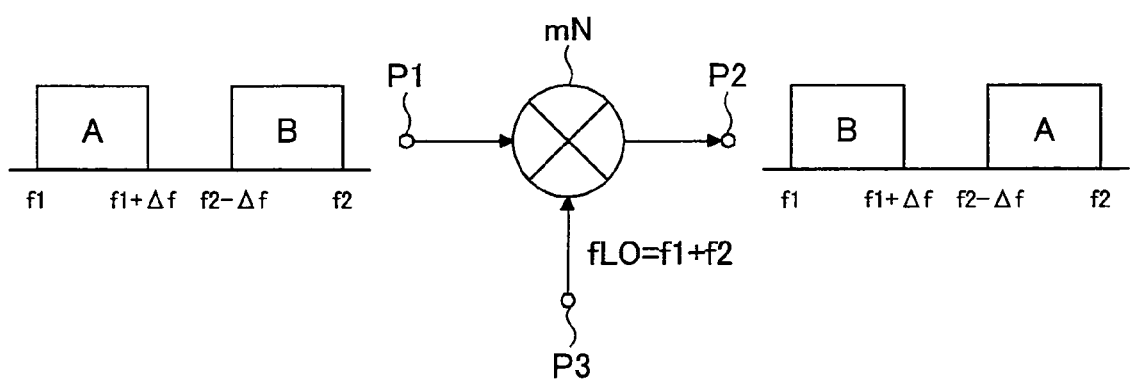
FIG. 3 shows how a mixer operates.

FIG. 3 shows a case where the mixer mN receives a synthesized signal made up of a first frequency band A and a second frequency band B. The input terminal P1 is an input terminal of the mixer mN, the output terminal P2 is an output terminal of the mixer mN, the local signal input terminal P3 is a local signal input terminal of the mixer mN, and a local signal frequency fLO is the frequency of a local signal supplied to the mixer mN. The first frequency band A is within the range of f1 to f1+Δf and the second frequency band B is within the range of f2−Δf to f2, where f1<f2.

The following will describe in what manner the local signal frequency fLO is set.

In case where the second frequency band B is higher than the first frequency band A, the local signal frequency fLO is figured out by adding the lowest frequency in the first frequency band A to the highest frequency in the second frequency band B. On the other hand, in case where the second frequency band B is lower than the first frequency band A, the local signal frequency fLO is figured out by adding the highest frequency in the first frequency band A to the lowest frequency in the second frequency band B. In the aforesaid synthesized signal, f1<f2 and the first frequency band A is higher than the second frequency band B. Therefore, the local signal frequency fLO is equal to f1+f2.

As described above, the frequency conversion without the overlapping of the first and second frequency bands A and B is achieved by setting the local signal frequency fLO. As a result, it is possible to reduce the interference in the synthesized signal.

Now, how the mixer mN operates is described. The synthesized signal supplied from the input terminal P1 is mixed, in the mixer mN, with the local signal supplied from the local signal input terminal P3. As a result of this, the first frequency band A of the synthesized signal is fLO−(f1 to f1+Δf)=f2−Δf to f2, and the second frequency band B of the synthesized signal is fLO−(f2−Δf to f2)=f1 to f1+Δf. In this manner, the first and second frequency bands A and B in the synthesized signal are interchanged with one another.

The local signal is preferably shared between all mixers. When the local signal is shared, the local signal can be supplied to all mixers by one local oscillator, even if the number of the mixers is large. This makes it possible to downsize the circuit and reduce the power consumption.

The following will describe an example of the amplifiers a1 and a2 and the mixers m1 and m2, and an example of the 2N×M switch circuit SW1 which is different from the 4×4 switch circuit SW2.

Figure 4:
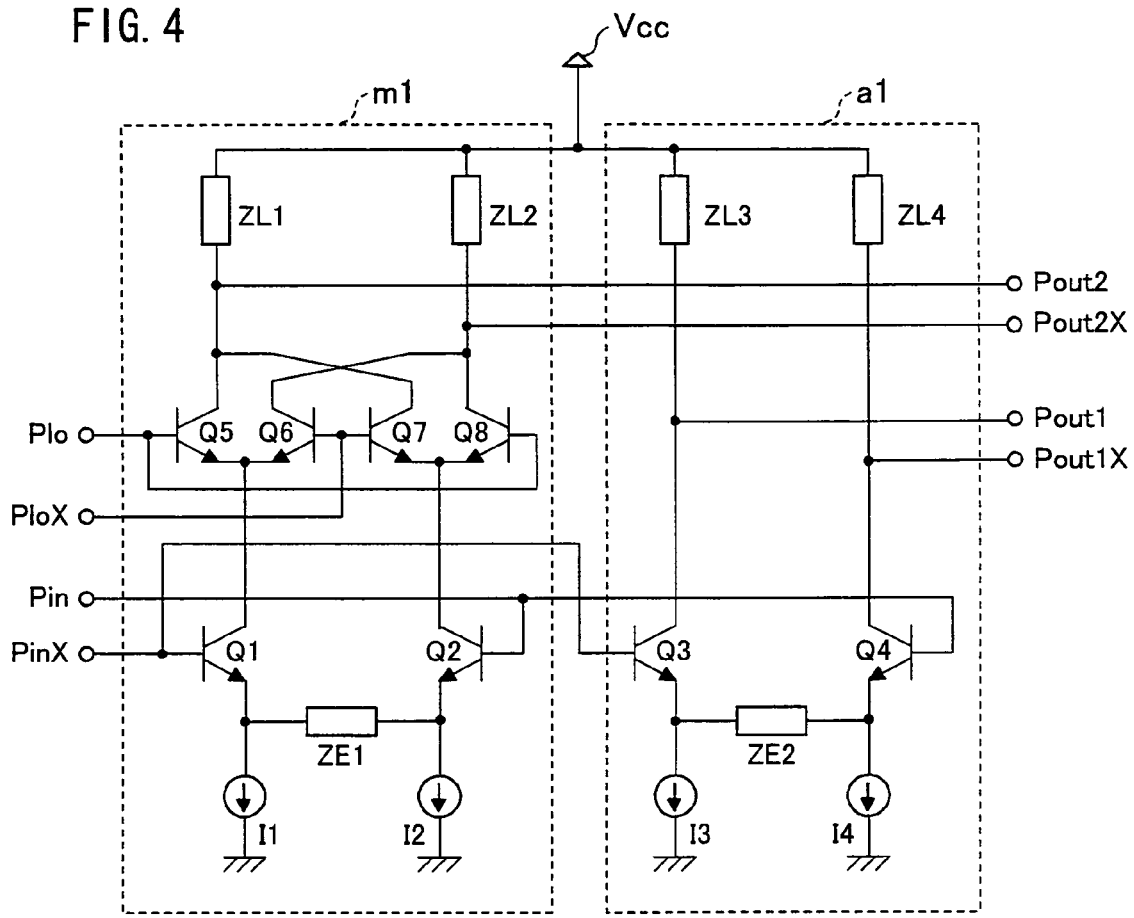
FIG. 4 shows an example where an amplifier is constituted by a differential amplification circuit and a mixer is constituted by a double balanced Gilbert mixer.

FIG. 4 shows an example where the mixer m1 is constituted by a double balanced Gilbert mixer and the amplifier a1 is constituted by a differential amplification circuit.

The double balanced Gilbert mixer includes: a transistor differential pair Q1 and Q2; an impedance element ZE1 provided between the emitter of a transistor Q1 (NPN type) of the transistor differential pair Q1 and Q2 and the emitter of a transistor Q2 (NPN type) of the transistor differential pair Q1 and Q2; a direct current source I1 connected to the emitter of the transistor Q1; and a direct current source I2 connected to the emitter of the transistor Q2.

The double balanced Gilbert mixer further includes: a transistor differential pair Q5 and Q6 which performs switching in response to a local signal; a transistor differential pair Q7 and Q8; an impedance load ZL1 provided between the collector of a transistor Q5 (NPN type) of the transistor differential pair Q5 and Q6 and a reference voltage source Vcc; and an impedance load ZL2 provided between a transistor Q8 (NPN type) of the transistor differential pair Q7 and Q8 and the reference voltage source Vcc.

The collector of the transistor Q1 is connected to the emitters of the transistor differential pair Q5 and Q6. The collector of the transistor Q2 is connected to the emitters of the transistor differential pair Q7 and Q8. The collector of a transistor Q6 (NPN type) of the transistor differential pair Q7 and Q8 is connected to the collector of the transistor Q8. The collector of a transistor Q7 (NPN type) of the transistor differential pair Q7 and Q8 is connected to the collector of the transistor Q5.

The connection point between the collector of the transistor Q5 and the impedance load ZL1 functions as a differential output terminal Pout2. The connection point between the collector of the transistor Q8 and the impedance load ZL2 functions as a differential output terminal Pout2X.

The base of the transistor Q5 is connected to the base of the transistor Q8, and the connection point of these bases acts as a local signal input terminal Plo of the transistor differential pair Q5 and Q6 and the transistor differential pair Q7 and Q8. The base of the transistor Q6 is connected to the base of the transistor Q7, and the connection point of these bases acts as a local signal input terminal PloX of the transistor differential pair Q5 and Q6 and the transistor differential pair Q7 and Q8.

The differential amplification circuit includes: a transistor differential pair Q3 and Q4; an impedance element ZE2 provided between the emitter of a transistor Q3 (NPN type) of the transistor differential pair Q3 and Q4 and the emitter of a transistor Q4 (NPN type) of the transistor differential pair Q3 and Q4; a direct current source I3 connected to the emitter of the transistor Q3; a direct current source I4 connected to the emitter of the transistor Q4; an impedance load ZL3 provided between the collector of the transistor Q3 and a reference voltage source Vcc; and an impedance load ZL4 provided between the collector of the transistor Q4 and the reference voltage source Vcc.

The connection point of the collector of the transistor Q3 and the impedance load ZL3 functions as a differential output terminal Pout1, and the connection point of the collector of the transistor Q4 and the impedance load ZL4 functions as a differential output terminal Pout 1X.

The base of the transistor Q1 of the double balanced Gilbert mixer is connected to the base of the transistor Q3 of the differential amplification circuit. The base of the transistor Q2 of the double balanced Gilbert mixer is connected to the base of the transistor Q4 of the differential amplification circuit. The differential input terminals Pin and PinX are shared between the double balanced Gilbert mixer and the differential amplification circuit.

As described above, in the signal recombination circuit 1, the gains of the amplifiers a1-aN are preferably identical with the gains of the mixers m1-mN. In case where the amplifiers a1-aN are constituted by the differential amplification circuits and the mixers m1-mN are constituted by the double balanced Gilbert mixers, the gains of the amplifiers a1-aN are equalized with the gains of the mixers m1-mN by appropriately adjusting the impedance loads ZL1 and ZL2 of the double balanced Gilbert mixers and the impedance loads ZL3 and ZL4 of the differential amplification circuit. When the amplifiers a1-aN and the mixers m1-mN are constituted by differential circuits as above, good resistance to disturbance and good noise characteristic are achieved.

Figure 5:
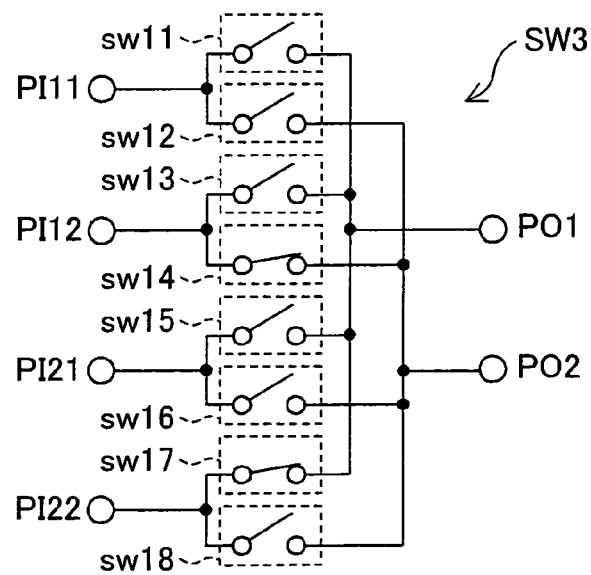
FIG. 5 shows an example of a 4×2 switch circuit.

As an example of the 2N×M switch circuit SW1, an example of a 4×2 switch circuit SW3 is shown in FIG. 5. The 4×2 switch circuit SW3 includes: switches sw11, sw12, sw13, sw14, sw15, sw16, sw17, and sw18; an input terminal PI11 shared between the switches sw1 and sw12; an input terminal PI12 shared between the switches sw13 and sw14; an input terminal PI21 shared between the switches sw15 and sw16; an input terminal P122 shared between the switches sw17 and sw18; an output terminal PO1 shared among the switches sw11, sw13, sw15, and sw17; and an output terminal PO2 shared among the switches sw12, sw14, sw16, and sw18.

With the arrangement above, a path from any one of the input terminals PI11, PI12, PI21, and PI22 to any one of the output terminals PO1 and PO2 can be formed by controlling the switches sw11-sw18. Also, it is possible to disconnect a path to the output terminals PO1 and PO2.

Figure 6:
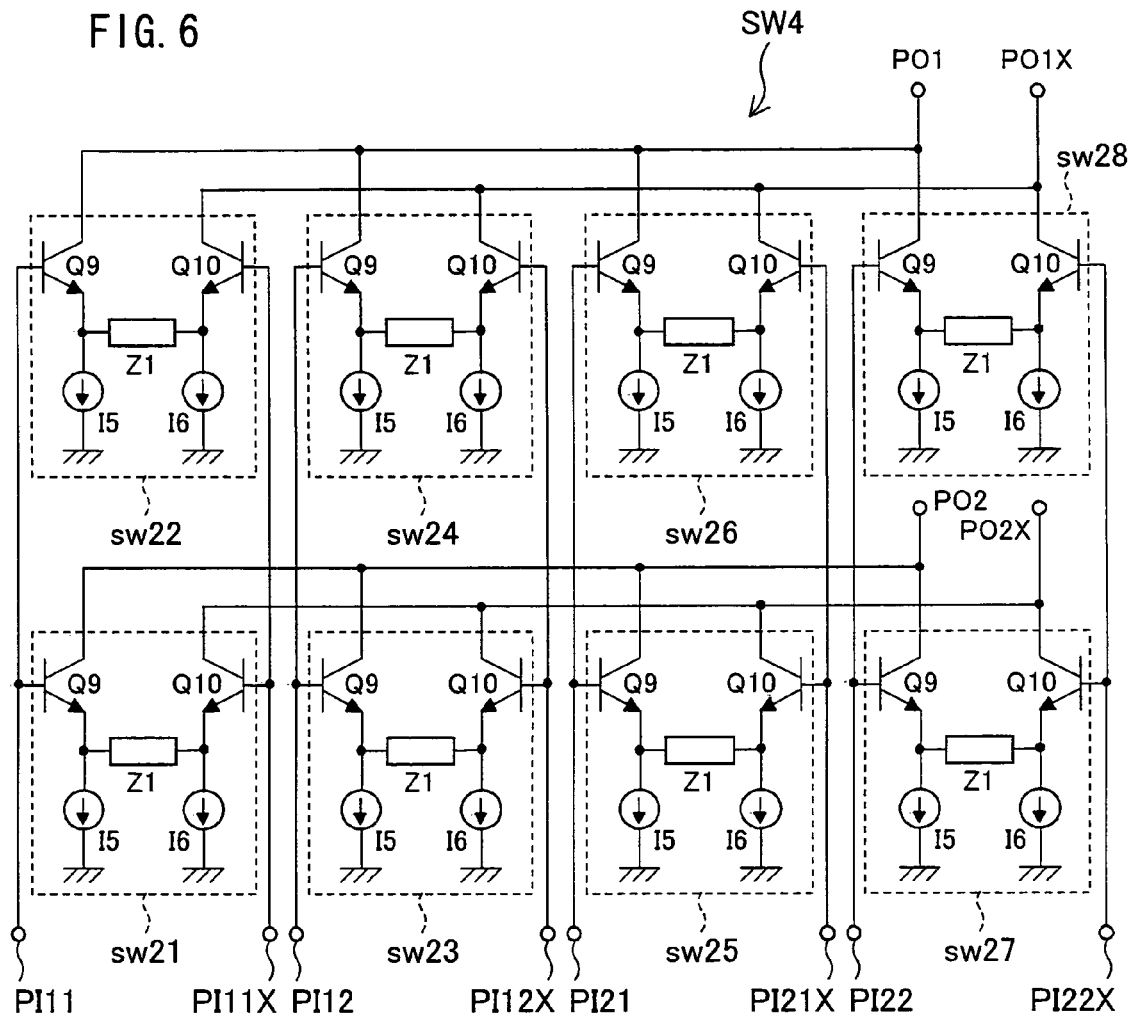
FIG. 6 shows another example of the 4×2 switch circuit.

As another example of the 4×2 switch circuit SW3, FIG. 6 shows an example of a 4×2 switch circuit SW4 constituted by a differential voltage-current conversion circuit. It is noted that members having the same numbers with those in the 4×2 switch circuit SW3 have the same functions, unless otherwise stated. Each of the below-mentioned differential input terminal and differential output terminal is a differential input terminal or a differential output terminal of one transistor differential pair, and is one input or output of the switch circuit.

The 4×2 switch circuit SW4 shown in FIG. 6 includes switches sw21, sw22, sw23, sw24, sw25, sw26, sw27, and sw28.

Each of the switches sw21-sw28 is a differential voltage-current conversion circuit including: a transistor differential pair Q9 and Q10; an impedance element Z1 provided between the emitter of a transistor Q9 (NPN type) of the transistor differential pair Q9 and Q10 and the emitter of a transistor Q10 (NPN type) of the transistor differential pair Q9 and Q10; a direct current source I5 connected to the emitter of the transistor Q9; and a direct current source I6 connected to the emitter of the transistor Q10.

The base of the transistor Q9 of the switch sw21 is connected to the base of the transistor Q9 of the switch 22, and the base of the transistor Q10 of the switch sw21 is connected to the base of the transistor Q10 of the switch sw22. With this arrangement, differential input terminals PI11 and PI11X, which are shared between the switched sw21 and sw22, are formed.

In a similar manner, the base of the transistor Q9 of the switch sw23 is connected to the base of the transistor Q9 of the switch 24, and the base of the transistor Q10 of the switch sw23 is connected to the base of the transistor Q10 of the switch sw24. With this arrangement, differential input terminals PI12 and PI12X, which are shared between the switched sw23 and sw24, are formed.

In a similar manner, the base of the transistor Q9 of the switch sw25 is connected to the base of the transistor Q9 of the switch 26, and the base of the transistor Q10 of the switch sw25 is connected to the base of the transistor Q10 of the switch sw26. With this arrangement, differential input terminals PI21 and PI21X, which are shared between the switched sw25 and sw26, are formed.

In a similar manner, the base of the transistor Q9 of the switch sw27 is connected to the base of the transistor Q9 of the switch 28, and the base of the transistor Q10 of the switch sw27 is connected to the base of the transistor Q10 of the switch sw28. With this arrangement, differential input terminals PI22 and PI22X, which are shared between the switched sw27 and sw28, are formed.

The aforesaid four differential input terminals function as four input terminals of the 4×2 switch circuit SW4.

The collectors of the transistors Q9 of the respective switches sw22, sw24, sw26, and sw28 are connected to one another, and the collectors of the transistors Q10 of the respective switches sw22, sw24, sw26, and sw28 are connected to one another. As a result of this, differential output terminals PO1 and PO1X are formed.

In a similar manner, the collectors of the transistors Q9 of the respective switches sw21, sw23, sw25, and sw27 are connected to one another, and the collectors of the transistors Q10 of the respective switches sw21, sw23, sw25, and sw27 are connected to one another. As a result of this, differential output terminals PO2 and PO2X are formed.

The aforesaid two differential output terminals function as two output terminals of the 4×2 switch circuit SW4.

The switches sw21-sw28 turn on/off the respective direct current sources I5 and I6 thereof so as to form a path from any one of the differential input terminals PI11, PI11X, PI12, PI12X, PI21, PI21X, PI22, and PI22X to any one of the differential output terminals PO1, PO1X, PO2, and PO2X, or so as to disconnect a path to any one of the differential output terminals PO1, POX, PO2, and PO2X.

Figure 7:
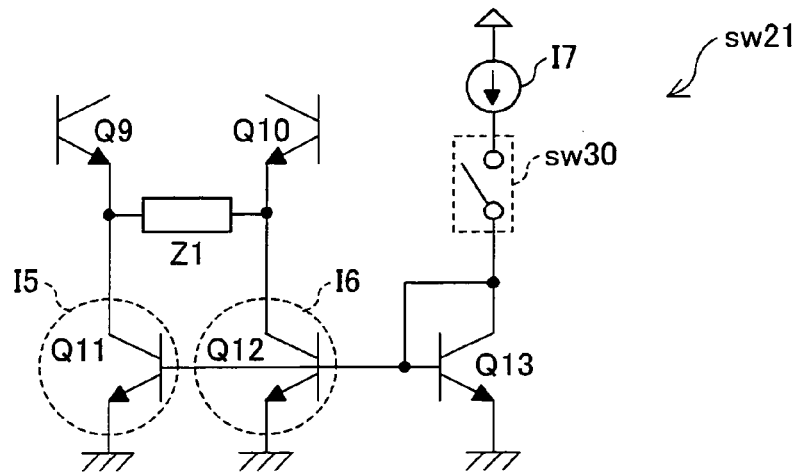
FIG. 7 shows an example of a circuit which turns ON/OFF a direct current source of the 4×2 switch circuit of FIG. 6.

FIG. 7 shows an example of a circuit for turning on/off the direct current sources I5 and I6 provided in each of the switches sw21-sw28. FIG. 7 takes the switch sw21 as an example. The basic circuit configuration of the switch sw21 is not described here because it has already been described above.

As shown in the figure, as the direct current sources I5 and I6 of the switch sw21, a direct current source I7, a switch sw30, and a current mirror circuit including transistors Q1, Q12, and Q13 (NPN type) are additionally provided. The direct current sources I5 and I6 are turned on/off by switching the switch sw30. In this manner, the operations of the switches sw21-sw28 are realized.

As described above, since the 2N×M switch circuit SW1 is made up of differential circuits, good resistance to disturbance and good noise characteristic are imparted to the 2N×M switch circuit SW1.

Figure 8:
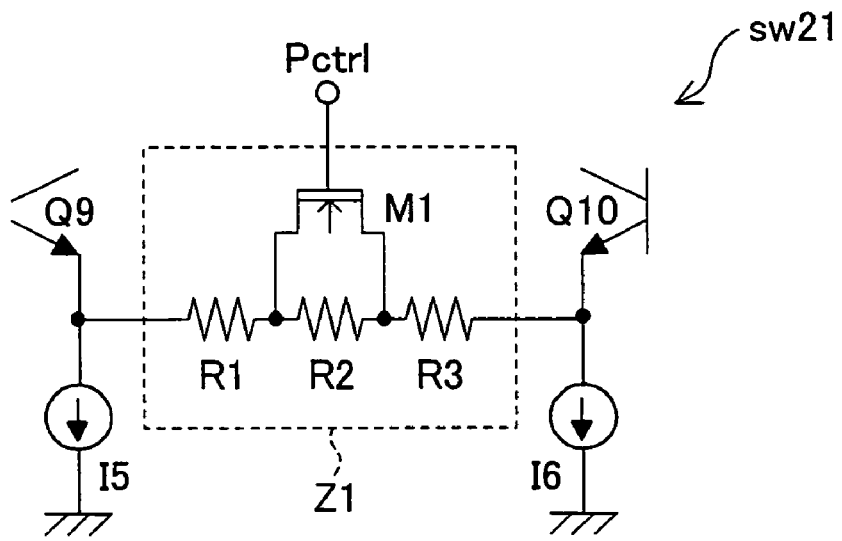
FIG. 8 shows an example of a circuit which causes an impedance element Z1 of the 4×2 switch circuit of FIG. 6 to be variable.

When the impedance element Z1 provided between the emitters of the transistor differential pair Q9 and Q10 in each of the switches sw21-sw28 is variable, the voltage-current conversion gain of each of the switches sw21-sw28 is also variable. FIG. 8 shows an example of the switches sw21-sw28 having such an arrangement. In FIG. 8, the switch sw21 is taken as an example. Since the basic circuit configuration of the switch sw21 has already been described, the description is omitted here.

FIG. 8 shows that the impedance element Z1 provided between the emitters of the transistor differential pair Q9 and Q10 of the switch sw21 includes: resistors R1, R2 and R3 connected in series; a MOS transistor M1 (n-channel type) connected to the both ends of the resistor R2; and an impedance control terminal Pctrl which is the gate of the MOS transistor M1. The MOS transistor M1 is turned ON/OFF by a voltage supplied to the impedance control terminal Pctrl. This causes the impedance element Z1 to be variable.

With this arrangement, in a system in which the output levels of the signals supplied from the signal recombination circuit 1 must be identical with one another, the variation of the output levels on account of a parasitic resistance component or a parasitic capacity component in the switches sw21-sw28 is compensated.

Figure 9:
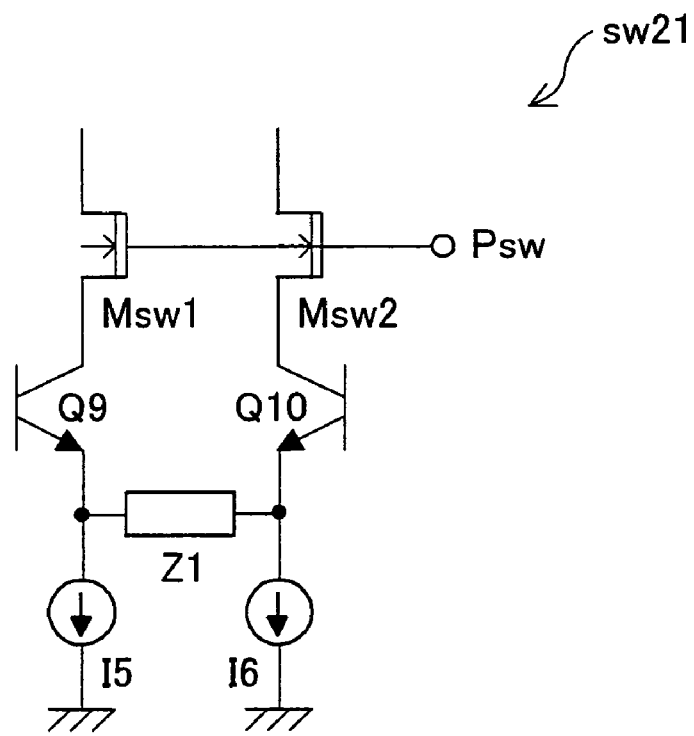
FIG. 9 shows an example of a circuit for further improving the isolation property of a signal which is supplied when the 4×2 switch circuit of FIG. 6 is OFF.

In order to further improve the signal isolation property when the switches sw21-sw28 are OFF, a switch may be additionally provided in each of the switches sw21-sw28. An example of the switches sw21-sw28 with the additional switch is illustrated in FIG. 9. In FIG. 9, the switch sw21 is taken as an example. The basic circuit configuration of the switch sw21 is not described here because it has already been described above.

FIG. 9 shows an arrangement in which the collectors of the transistor differential pair Q9 and Q10 of the switch sw21 are connected to MOS transistors Msw1 and Msw2 (n-channel type) and a control terminal Psw which is the gates of the transistors Msw1 and Msw2. The MOS transistors Msw1 and Msw2 are turned ON/OFF by a voltage supplied to the control terminal Psw.

With the arrangement above, the isolation property is improved by turning off the transistors Msw1 and Msw2 when the switches sw21-sw28 are OFF.

The present invention is not limited to the above-described example of the amplifiers a1 and a2, the mixers m1 and m2, and the 2N×M switch circuit SW1 which is different from the 4×4 switch circuit SW2.

Because the above-described signal recombination circuit 2 is provided in the LNB, the leakage of the first and second synthesized signals and the difference between the output levels of these signals are restrained, and the numbers of mixers in the LNB is reduced. Also, in case where the LNB is provided with the 2N×M switch circuit SW1 shown in FIG. 1, N synthesized signals can be supplied to the signal recombination circuit.

Embodiment 2

Figure 10:
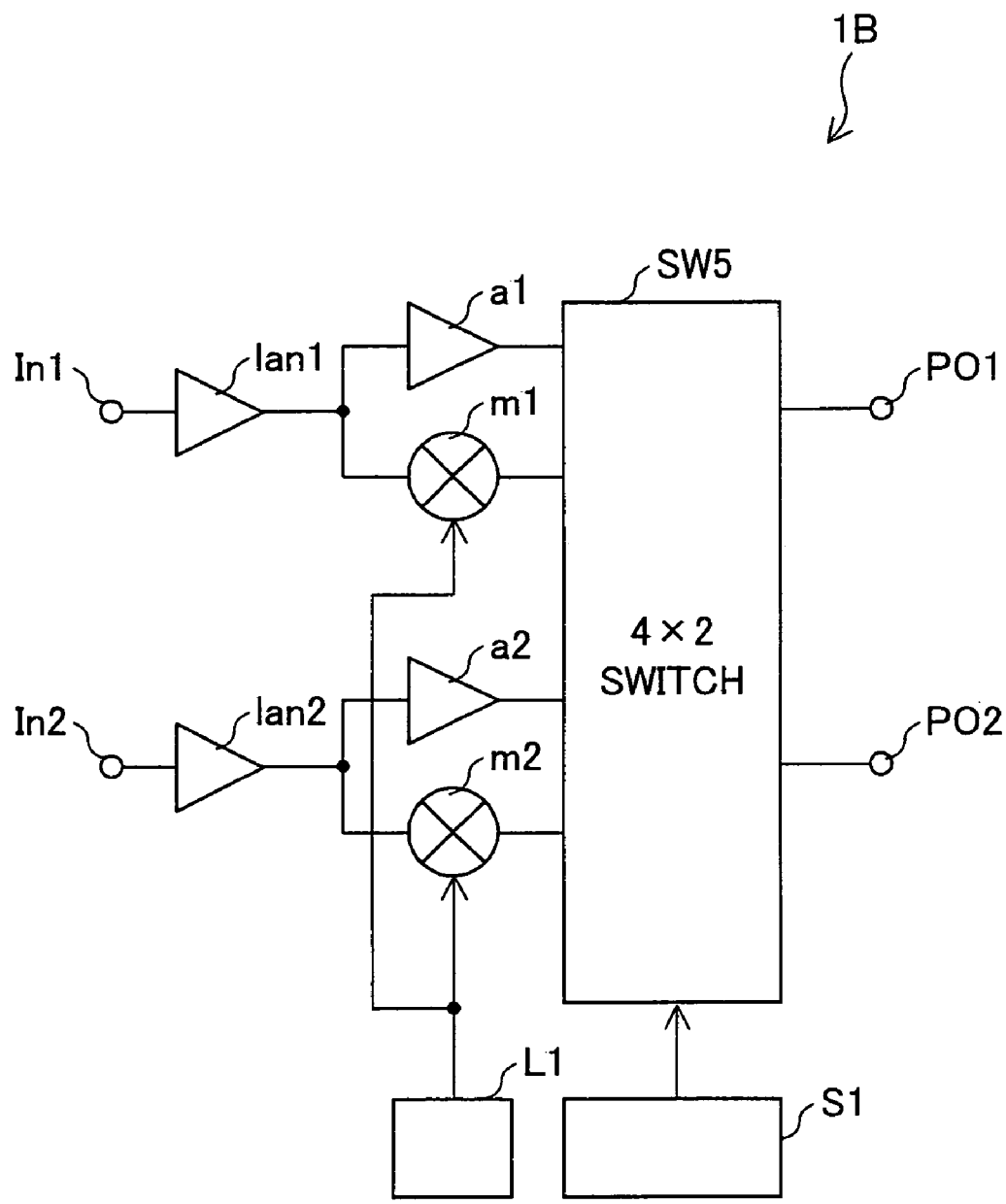
FIG. 10 relates to a further embodiment and is a block diagram showing the substantial part of a signal recombination circuit 2.
Figure 11:
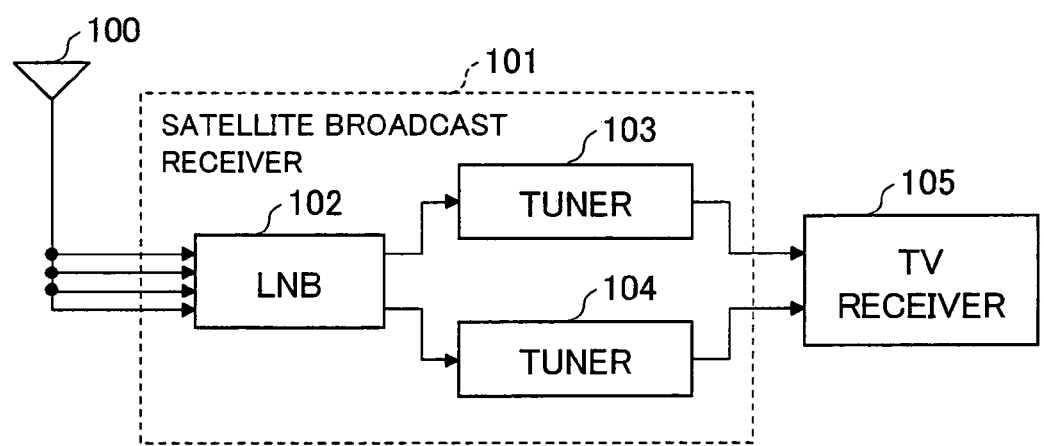
FIG. 11 relates to a conventional art and outlines a satellite broadcast receiver.
Figure 12:
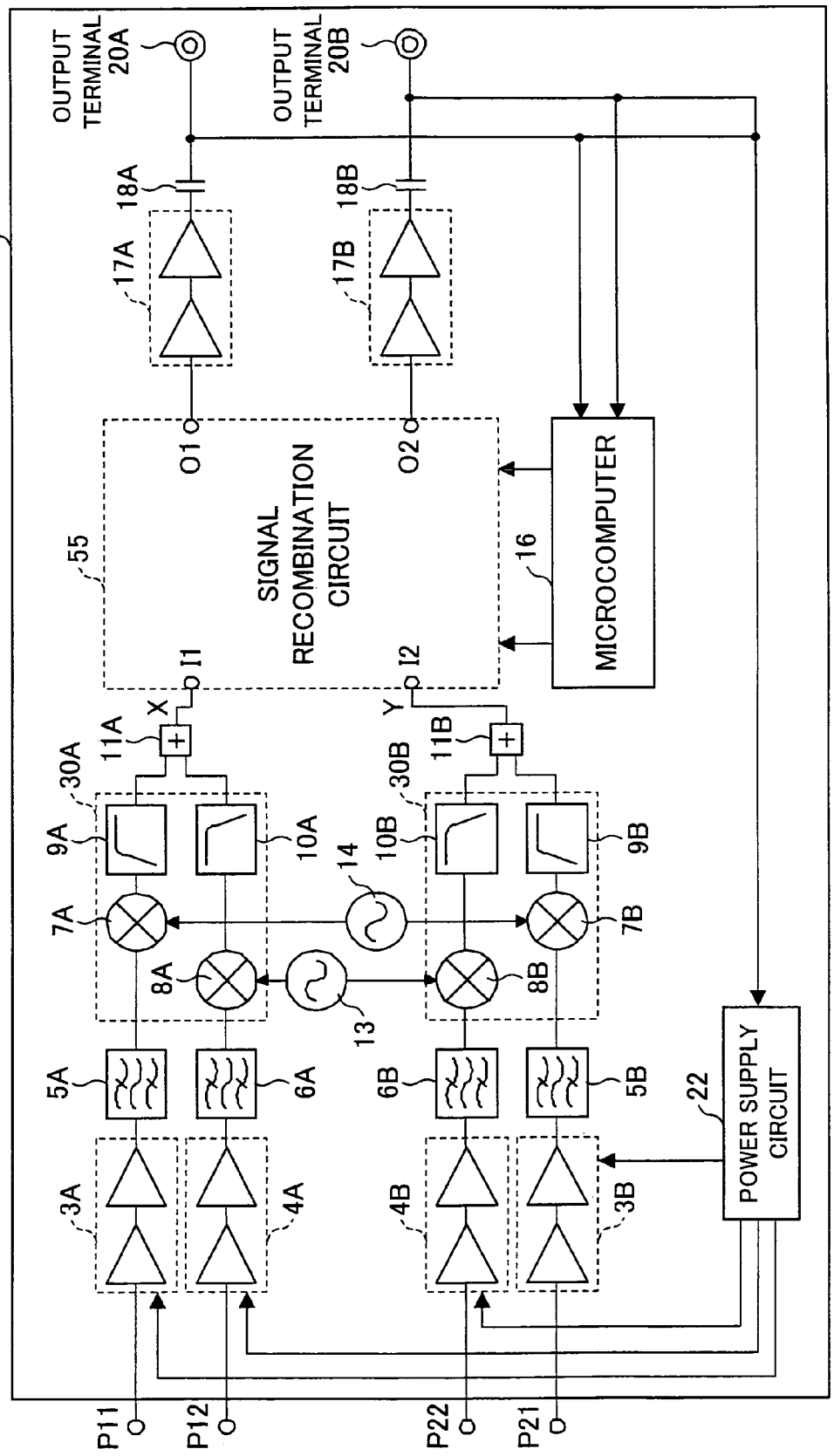
FIG. 12 relates to the conventional art and is a circuit diagram of a LNB.

FIG. 10 outlines a switch block 1B in a signal recombination circuit 2 of another embodiment of the present invention. It is noted that members having the same numbers as those in the switch block 1A have the same functions, unless otherwise stated.

As shown in the figure, the switch block 1B includes low noise amplifiers (LNAs) lna1 and lna2, amplifiers a1 and a2, mixers m1 and m2, a 4×2 switch circuit SW5, a local signal generator L1, and a control device S1. Input terminals In1 and In2 are input terminals of the switch block 1B, whereas output terminals PO1 and PO2 are output terminals of the switch block 1B.

The low noise amplifier lna1 subjects, to low noise amplification, the first synchronized signal supplied to the input terminal In1. The low noise amplifier lna2 subjects, to low noise amplification, the second synchronized signal supplied to the input terminal In2. The 4×2 switch circuit SW5 is an example of the 2N×M switch circuit SW1.

The following will describe how these members are connected to one another.

The input terminal In1 is connected to the low noise amplifier lna1. The output of the low noise amplifier lna1 is divided into two outputs. One of these outputs is supplied to the amplifier a1, whereas the other one of the outputs is supplied to the mixer m1.

In a similar manner, the input terminal In2 is connected to the low noise amplifier lna2. The output of the low noise amplifier lna2 is divided into two outputs. One of these outputs is supplied to the amplifier a2, whereas the other one of the outputs is supplied to the mixer m2.

The outputs of the amplifiers a1 and a2 and the outputs of the mixers m1 and m2 are supplied to the 4×2 switch circuit SW5.

How these members operate is not described here, because it is identical with the operation of the signal recombination circuit 2 which has been described in Embodiment 1.

The noise characteristic of the LNB is more influenced by the circuits in the stages prior to the signal recombination circuit than the circuits in the stages subsequent to the signal recombination circuit. For this reason, the noise characteristic is improved as compared to the signal recombination circuit 2 which is provided with the switch block 1A, because the low noise amplifiers lna1 and lna2 are provided between (i) the input terminals In1 and In2 and (ii) the amplifiers a1 and a2 and the mixers m1 and m2. The LNB can therefore be used in a system which sets stringent requirements for the noise characteristic.

The gains of the low noise amplifiers lna1 and lna2 may be variable. In case where the levels of the signals on the input terminals In1 and In2 are high, the signals are skewed after they are amplified by the low noise amplifiers lna1 and lna2. If the gains of the low noise amplifiers lna1 and lna2 are variable, the signal skew is restrained in the case above, by reducing the gains of the low noise amplifiers lna1 and lna2.

As described above, a signal recombination circuit 2 with a better noise characteristic is obtained by providing low noise amplifiers lna1 and lna2 in the stages prior to amplifiers a1 and a2 and mixers m1 and m2.

In the integrated circuit device of the present embodiment, the 2N×M switch section is provided in the stage subsequent to the N bandwidth conversion sections and the N amplification sections. Therefore, if N<M, the number of mixers in the N bandwidth conversion sections is reduced as compared to the conventional art, and hence cost reduction is achieved.

The integrated circuit device of the present embodiment may be further arranged such that the gains of the amplification sections are identical with the gains of the N bandwidth conversion section.

According to this arrangement, when the gains of the N amplification sections are identical with the gains of the N bandwidth conversion section, the output level of the input signal does not change even if a path where the frequency conversion of the input signal is carried out and a path where the frequency conversion of the input signal is not carried out are separately provided.

The integrated circuit device of the present embodiment may be further arranged such that the N amplification sections include differential amplification circuits.

According to this arrangement, since the differential amplification circuits adopt differential input/output, the N amplification sections which are the differential amplification circuits have resistance to disturbance and noise as compared to those with a single arrangement.

In addition to the above, the integrated circuit device of the present embodiment may be arranged such that the N bandwidth conversion sections include double balanced Gilbert mixers.

According to this arrangement, since the double balanced Gilbert mixers adopt differential input/output, the N bandwidth conversion sections which are the double balanced Gilbert mixers have resistance to disturbance and noise.

In addition to the above, the integrated circuit device of the present embodiment may be arranged such that the N bandwidth conversion sections subject, to the frequency conversion, (i) signals which are in a first frequency band, among the N input signals and (ii) signals which are in a second frequency band, among the N input signals, the frequency conversion being carried out so as to cause the first frequency band and the second frequency band not to overlap with one another.

According to the arrangement above, the interference in the input signals is reduced by performing frequency conversion in such a manner that the first and second frequency bands are not overlapped with one another. It is noted that, for example, the first frequency band is the high band in the conventional art, whereas the second frequency band is the low band in the conventional art.

In addition to the above, the integrated circuit device of the present embodiment may be arranged such that in case where the second frequency band is higher than the first frequency band, a frequency of a local signal, which is supplied to the N bandwidth conversion sections for the frequency conversion of the N bandwidth conversion sections, is figured out by adding the lowest frequency in the first frequency band to the highest frequency in the second frequency band.

According to the arrangement above, in the N bandwidth conversion sections, frequency conversion is carried out without the overlapping of the first and second frequency bands of the input signals, by setting the frequency of the local signal as above.

In addition to the above, the integrated circuit device of the present embodiment may be arranged such that in case where the second frequency band is lower than the first frequency band, a frequency of a local signal, which is supplied to the N bandwidth conversion sections for the frequency conversion of the N bandwidth conversion sections, is figured out by adding the highest frequency in the first frequency band to the lowest frequency in the second frequency band.

According to the arrangement above, in the N bandwidth conversion sections, frequency conversion is carried out without the overlapping of the first and second frequency bands of the input signals, by setting the frequency of the local signal as above.

In addition to the above, the integrated circuit device of the present embodiment may be arranged such that a local signal, which is supplied to the N bandwidth conversion sections for the frequency conversion of the N bandwidth conversion sections, is shared between all of the N bandwidth conversion sections.

According to the arrangement above, since a single type of the local signal is supplied to all of the N bandwidth conversion sections, the supply of the local signal can be done by one local oscillator, even if the number of the bandwidth conversion sections is large. This makes it possible to downsize the circuit and reduce the power consumption.

In addition to the above, the integrated circuit device of the present embodiment may further include low noise amplification sections which are provided between (i) the N inputs and (ii) the N amplification sections and the N bandwidth conversion sections.

According to the arrangement above, the noise characteristic is improved because the low noise amplification sections are provided between (i) the N inputs and (ii) the N amplification sections and the N bandwidth conversion sections. The aforesaid arrangement can therefore be used in a system which sets stringent requirements for the noise characteristic.

In addition to the above, the integrated circuit device of the present embodiment may be arranged such that gains of the low noise amplification sections are variable.

For example, in a case where the input signal level is high, the input signal is skewed if the signal is further amplified by the low noise amplification section. In such a case, as described above, the gain of the low noise amplification circuit can be reduced if the gain is variable. This makes it possible to restrain the skew of the input signal.

In addition to the above, the integrated circuit device of the present embodiment may be arranged such that the 2N×M switch section includes a differential voltage-current conversion circuit.

According to the arrangement above, the differential voltage-current conversion circuit adopts differential input/output, and hence has a high input impedance. On this account, the 2N×M switch section which is a differential voltage-current conversion circuit has resistance to disturbance and noise.

In addition to the above, the integrated circuit device of the present embodiment may be arranged such that the differential voltage-current conversion circuit is switched ON/OFF by bias control.

With this arrangement, the 2N×M switch section is operated.

In addition to the above, the integrated circuit device of the present embodiment may be arranged such that a voltage-current conversion gain of the differential voltage-current conversion circuit is variable.

For example, in a system in which the output levels of signals supplied from the integrated circuit device must be identical to each other, it is possible to compensate the variation in the output levels on account of the parasitic resistance component or parasitic capacity component in the differential voltage-current conversion circuit, by allowing the gain of the differential voltage-current conversion circuit to be variable as above.

In addition to the above, the integrated circuit device of the present embodiment may be arranged such that the differential voltage-current conversion circuit includes a switch, and an output of the differential voltage-current conversion circuit is switched ON/OFF by turning ON/OFF the switch.

According to the arrangement above, the isolation property between the differential voltage-current conversion circuit and the circuits in the subsequent stages is further improved by adding a switch to the output section of the differential voltage-current conversion circuit.

The present invention is not limited to the description of the embodiments above, but may be altered by a skilled person within the scope of the claims. An embodiment based on a proper combination of technical means disclosed in different embodiments is encompassed in the technical scope of the present invention.

What is claimed is:

1. An integrated circuit device which has N inputs and M outputs, each of N input signals supplied to the respective N inputs being divided into two divided input signals,
   the integrated circuit device comprising:
   N amplification sections each of which amplifies one of said divided input signals;
   N bandwidth conversion section each of which subjects, to frequency conversion, the other one of said divided input signals; and
   a 2N×M switch section which (i) receives 2N input signals that are made up of 2N output signals supplied from the N amplification sections and the N bandwidth conversion sections, and (ii) is controlled so as to output a signal, which is selected from said 2N input signals, to an output selected from said M outputs.

2. The integrated circuit device as defined in claim 1, wherein, gains of the N amplification sections are identical with gains of the N bandwidth conversion sections.

3. The integrated circuit device as defined in claim 1, wherein, the N amplification sections include differential amplification circuits.

4. The integrated circuit device as defined in claim 1, wherein, the N bandwidth conversion sections include double balanced Gilbert mixers.

5. The integrated circuit device as defined in claim 1, wherein, the N bandwidth conversion sections subject, to the frequency conversion, (i) signals which are in a first frequency band, among the N input signals and (ii) signals which are in a second frequency band, among the N input signals, the frequency conversion being carried out so as to cause the first frequency band and the second frequency band not to overlap with one another.

6. The integrated circuit device as defined in claim 5, wherein, in case where the second frequency band is higher than the first frequency band, a frequency of a local signal, which is supplied to the N bandwidth conversion sections for the frequency conversion of the N bandwidth conversion sections, is figured out by adding the lowest frequency in the first frequency band to the highest frequency in the second frequency band.

7. The integrated circuit device as defined in claim 5, wherein, in case where the second frequency band is lower than the first frequency band, a frequency of a local signal, which is supplied to the N bandwidth conversion sections for the frequency conversion of the N bandwidth conversion sections, is figured out by adding the highest frequency in the first frequency band to the lowest frequency in the second frequency band.

8. The integrated circuit device as defined in claim 1, wherein, a local signal, which is supplied to the N bandwidth conversion sections for the frequency conversion of the N bandwidth conversion sections, is shared between all of the N bandwidth conversion sections.

9. The integrated circuit device as defined in claim 1, further comprising low noise amplification sections which are provided between (i) the N inputs and (ii) the N amplification sections and the N bandwidth conversion sections.

10. The integrated circuit device as defined in claim 9, wherein, gains of the low noise amplification sections are variable.

11. The integrated circuit device as defined in claim 1, wherein, the 2N×M switch section includes a differential voltage-current conversion circuit.

12. The integrated circuit device as defined in claim 11, wherein, the differential voltage-current conversion circuit is switched ON/OFF by bias control.

13. The integrated circuit device as defined in claim 11, wherein, a voltage-current conversion gain of the differential voltage-current conversion circuit is variable.

14. The integrated circuit device as defined in claim 11, wherein, the differential voltage-current conversion circuit includes a switch, and an output of the differential voltage-current conversion circuit is switched ON/OFF by turning ON/OFF the switch.

15. A low noise block down converter including a signal recombination circuit with an integrated circuit device, the integrated circuit device having N inputs and M outputs, each of N input signals supplied to the respective N inputs being divided into two divided input signals, the integrated circuit device including:

N amplification sections each of which amplifies one of said divided input signals;

N bandwidth conversion section each of which subjects, to frequency conversion, the other one of said divided input signals; and a 2N×M switch section which (i) receives 2N input signals that are made up of 2N output signals supplied from the N amplification sections and the N bandwidth conversion sections, and (ii) is controlled so as to output a signal, which is selected from said 2N input signals, to an output selected from said M outputs.

* * * * *